(12) United States Patent
Dengler et al.

(10) Patent No.: US 9,926,231 B2
(45) Date of Patent: Mar. 27, 2018

(54) DISPERSANT FOR INORGANIC PARTICLES

(71) Applicant: Construction Research & Technology GmbH, Trostberg (DE)

(72) Inventors: Joachim Dengler, Tacherting (DE); Alexander Kraus, Pittenhart (DE)

(73) Assignee: Construction Research & Technology, GmbH, Trostberg (DE)

( * ) Notice: Subject to any disclaimer, the term of this patent is extended or adjusted under 35 U.S.C. 154(b) by 674 days.

(21) Appl. No.: 14/371,096

(22) PCT Filed: Dec. 7, 2012

(86) PCT No.: PCT/EP2012/074797
§ 371 (c)(1),
(2) Date: Jul. 8, 2014

(87) PCT Pub. No.: WO2013/104472
PCT Pub. Date: Jul. 18, 2013

(65) Prior Publication Data
US 2014/0353551 A1    Dec. 4, 2014

(30) Foreign Application Priority Data

Jan. 13, 2012    (EP) .................................. 12151130

(51) Int. Cl.
*C04B 24/26* (2006.01)
*C04B 24/24* (2006.01)
(Continued)

(52) U.S. Cl.
CPC ........ *C04B 24/2611* (2013.01); *C04B 24/243* (2013.01); *C04B 28/021* (2013.01);
(Continued)

(58) Field of Classification Search
USPC ........................................................ 544/195
See application file for complete search history.

(56) References Cited

U.S. PATENT DOCUMENTS 3,879,389 A * 4/1975 Kan ..................... C07D 251/28
544/196
5,240,499 A * 8/1993 Az ........................ B01F 17/005
106/498
(Continued)

FOREIGN PATENT DOCUMENTS

CA    2782941 A1 * 6/2011
CN    1212972 A     4/1999
(Continued)

OTHER PUBLICATIONS

PCT/EP2012/074797—International Search Report, dated Jun. 3, 2013.
(Continued)

*Primary Examiner* — Daniel S Metzmaier
(74) *Attorney, Agent, or Firm* — Curatolo Sidoti Co., LPA; Joseph G. Curatolo; Salvatore A. Sidoti

(57) ABSTRACT

The invention relates to dispersants for inorganic particles, preferably for hydraulic binders, which comprises the following structural units:
  i) at least one triazine structural unit,
  ii) at least one polyalkylene glycol structural unit, and
  iii) at least two phosphoric ester structural units on at least one carbon atom of one or more aromatic triazine rings of the formulae (IIa) and/or (IIb):

—N—(CH$_2$CH$_2$—O—PO$_3$H$_2$)$_2$,    (IIa)

and

—NH—CH$_2$CH$_2$—O—PO$_3$H$_2$.    (IIb)

The invention also relates to a process for preparing the dispersants, to building material mixtures comprising one or more dispersants and one or more inorganic binders. The invention relates to the use of the dispersants as a water
(Continued)

reducing agent, as a means for reducing the viscosity and for enhancing the early strengths of aqueous inorganic binders, and also to the use as a grinding aid in the production of cement.

30 Claims, 1 Drawing Sheet

(51) Int. Cl.
| | |
|---|---|
| C04B 28/02 | (2006.01) |
| C04B 28/04 | (2006.01) |
| C04B 28/08 | (2006.01) |
| C04B 28/14 | (2006.01) |
| C04B 28/16 | (2006.01) |
| C08G 65/333 | (2006.01) |
| C08G 65/335 | (2006.01) |
| C04B 103/30 | (2006.01) |
| C04B 103/40 | (2006.01) |
| C04B 103/52 | (2006.01) |

(52) U.S. Cl.
CPC ............. *C04B 28/04* (2013.01); *C04B 28/08* (2013.01); *C04B 28/146* (2013.01); *C04B 28/147* (2013.01); *C04B 28/16* (2013.01); *C08G 65/3353* (2013.01); *C08G 65/3356* (2013.01); *C08G 65/33317* (2013.01); *C04B 2103/302* (2013.01); *C04B 2103/308* (2013.01); *C04B 2103/408* (2013.01); *C04B 2103/52* (2013.01); *Y02W 30/92* (2015.05); *Y02W 30/94* (2015.05)

(56) References Cited

U.S. PATENT DOCUMENTS

| | | | | |
|---|---|---|---|---|
| 5,296,598 A | * | 3/1994 | Cipolli | C07F 9/65216 534/617 |
| 5,312,918 A | * | 5/1994 | Schmidhauser | C07D 405/12 544/218 |
| 5,558,709 A | | 9/1996 | Weichmann et al. | |
| 5,750,634 A | * | 5/1998 | Albrecht | C08G 12/40 524/593 |
| 5,891,983 A | | 4/1999 | Albrecht et al. | |
| 6,376,581 B1 | | 4/2002 | Tanaka et al. | |
| 6,555,683 B1 | | 4/2003 | Weichmann et al. | |
| 7,199,169 B2 | | 4/2007 | Endo et al. | |
| 2008/0108732 A1 | * | 5/2008 | Wieland | C04B 24/243 524/4 |
| 2008/0125520 A1 | | 5/2008 | Einfeldt et al. | |
| 2011/0098363 A1 | * | 4/2011 | Garnier | A61K 8/4966 514/772 |
| 2011/0269875 A1 | | 11/2011 | Nicoleau et al. | |
| 2011/0281975 A1 | | 11/2011 | Kraus et al. | |
| 2012/0058356 A1 | | 3/2012 | Smith et al. | |
| 2012/0252987 A1 | | 10/2012 | Peretolchin et al. | |

FOREIGN PATENT DOCUMENTS

| | | | |
|---|---|---|---|
| DE | 10 2005 022 843 A1 | | 11/2006 |
| EP | 0 753 488 A2 | | 1/1997 |
| EP | 2 128 142 A1 | | 12/2009 |
| EP | 2 128 143 A1 | * | 12/2009 |
| EP | 2 128 144 A1 | * | 12/2009 |
| JP | S 54-063093 A | | 5/1979 |
| JP | S 60-103060 A | | 6/1985 |
| JP | H 10-158045 A | | 6/1988 |
| JP | H 08-259652 A | | 10/1996 |
| JP | H 11-502880 A | | 3/1999 |
| JP | 2001-172069 A | | 6/2001 |
| JP | 2002-5202322 A | | 7/2002 |
| JP | 2007-112959 A | | 5/2007 |
| WO | WO 00/02869 A1 | | 1/2000 |
| WO | WO 02/098866 A1 | | 12/2002 |
| WO | WO 2009/144274 A2 | * | 12/2009 |
| WO | WO 2010/026155 A1 | | 3/2010 |
| WO | WO 2010/040611 A1 | | 4/2010 |
| WO | WO 2011/073246 A1 | | 6/2011 |

OTHER PUBLICATIONS

PCT/EP2012/074797—International Written Opinion, dated Jun. 3, 2013.
PCT/EP2012/074797—International Preliminary Report on Patentability, dated Jul. 15, 2014.

* cited by examiner

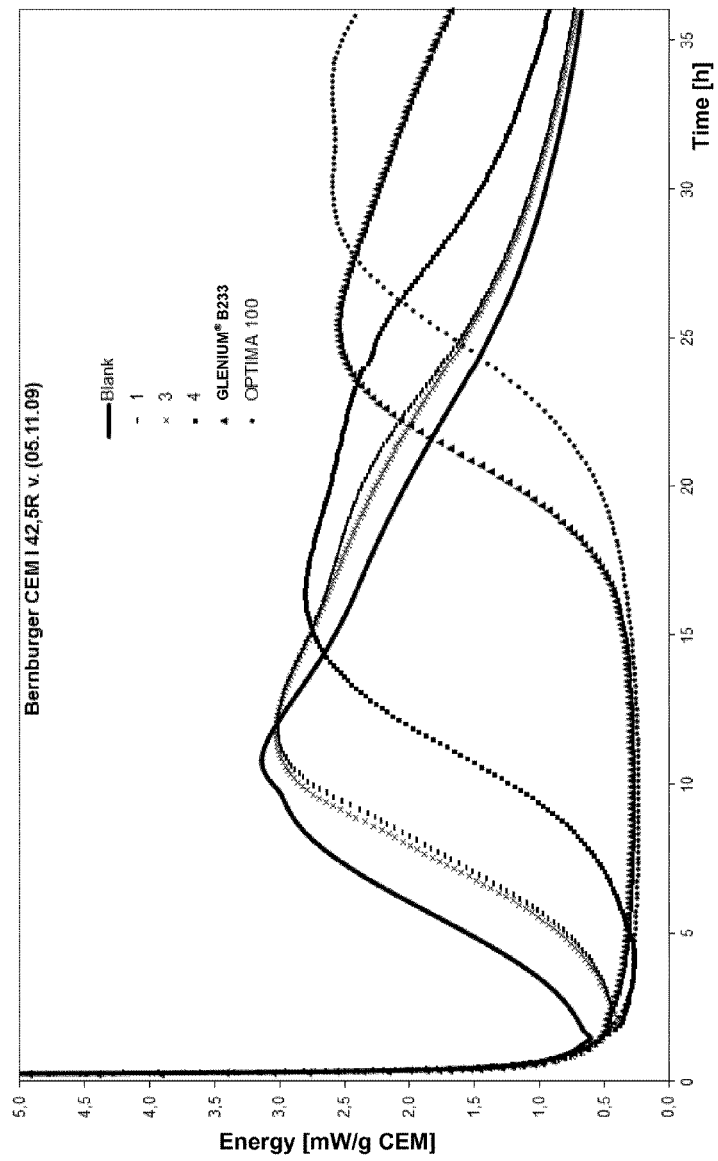

DISPERSANT FOR INORGANIC PARTICLES

CROSS REFERNCE TO RELATED APPLICATIONS

The application is a national stage application of International Application No. PCT/EP2012/074797, filed 7 Dec. 2012, which claims priority from European Patent Application No. 12151130.7, filed 13 Jan. 2012, from which applications priority is claimed, and which are incorporated herein by reference.

The present invention relates to a dispersant for inorganic particles, preferably for inorganic binders, more preferably for hydraulic binders, said dispersant comprising the following structural units i) at least one triazine structural unit, preferably at least one 1,3,5-triazine structural unit, the case of more than one triazine structural unit being referred to as case A and the case of one triazine structural unit being referred to as case B, and in case A preferably 2 to 6, more preferably 2 to 4 and especially preferably 2 triazine structural units being present, ii) at least one polyalkylene glycol structural unit, preferably one to 4 and more preferably one or two polyalkylene glycol structural units, especially preferably one polyalkylene glycol structural unit, iii) and at least two phosphoric ester structural units, preferably 2 to 10, more preferably 2 to 6 and especially preferably 2 to 4 phosphoric ester structural units.

The invention further relates to a process for preparing the dispersants for inorganic particles, characterized in that 1.) the following reactants are used:
a) one or more trihalotriazines, preferably 2,4,6-trihalo-1,3,5-triazine, especially preferably 2,4,6-trichloro-1,3,5-triazine,
b) one or more compounds which comprise at least one polyalkylene glycol unit and react with the halogen substituents of the trihalotriazine, preferably a nucleophilic compound, the compound more preferably comprising only one nucleophilic radical reactive with the halogen substituents of the trihalotriazine,
c-1) one or more compound(s) each independently selected from primary and/or secondary amino alcohols, preferably selected from primary and/or secondary alkanolamines, more preferably from primary and/or secondary alkanolamines having more than one hydroxyl function and only one primary or secondary amino function, especially preferably diethanolamine,
and
c-2) at least one phosphating agent, preferably a phosphating agent for phosphation of hydroxyl functions, more preferably a phosphating agent selected from phosphoric acid, phosphorus pentoxide, phosphorus pentachloride, $POCl_3$ and/or polyphosphoric acid, preference being given to polyphosphoric acid, or alternatively 2.) the reactants a) and b) are used, and independently one or more primary and/or secondary amino alcohol(s) C) phosphated on the hydroxyl function(s), preferably phosphated primary and/or secondary alkanolamine(s), more preferably phosphated primary and/or secondary alkanolamines having more than one phosphated hydroxyl function and only one primary or secondary amino function, especially preferably diphosphated and/or monophosphated diethanolamine, are used.

The invention also relates to building material mixtures comprising one or more dispersants according to any of Claims 1 to 11 and one or more hydraulic inorganic binders selected from the group of (portland) cement, $\alpha$-calcium sulfate hemihydrate, $\beta$-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion greater than 40% by weight based on the total amount of the inorganic binder in the inorganic binder. Examples of natural pozzolans include volcanic ashes, trass, tuff, pumice, sedimentary rock, aluminas and ignimbrite. Natural pozzolans shall preferably be understood to mean trass, pumice, aluminas, tuff and/or ignimbrite.

The invention also relates to the use of the dispersants as water reducing agents of aqueous inorganic binders, selected from the group of (portland) cement, $\alpha$-calcium sulfate hemihydrate, $\beta$-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion greater than 40% by weight based on the total amount of the inorganic binder in the inorganic binder, more preferably for concrete, especially preferably for concrete for precast component works.

The invention likewise relates to the use of the inventive dispersants as a grinding aid in the production of cement.

The invention also relates to the use as a means for reducing the viscosity of aqueous inorganic binders, and to the use for enhancing the early strengths of aqueous inorganic binders, the inorganic binders being selected in each case from the group of (portland) cement, $\alpha$-calcium sulfate hemihydrate, $\beta$-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion of greater than 40% by weight based on the total amount of the inorganic binder in the inorganic binder.

It is known that aqueous slurries of pulverulent inorganic or organic substances, such as clays, silicate powder, chalk, carbon black, rock flour and hydraulic binders are often admixed with admixtures in the form of dispersants to improve the processibility thereof, i.e. kneadability, spreadability, sprayability, pumpability or flowability. Such admixtures are capable of breaking up solid agglomerates, of dispersing the particles formed, and of improving the fluidity in this way. This effect is also utilized in a specific manner particularly in the production of building material mixtures which comprise hydraulic binders such as cement, lime, gypsum, calcium sulfate hemihydrate (bassanite) or anhydrous calcium sulfate (anhydrite), or latently hydraulic binders such as fly ash, blast furnace slag or pozzolans.

In order to convert these building material mixtures based on the binders mentioned to a processible form ready for use, generally much more mixing water is required than would be necessary for the subsequent hydration and setting operation. The cavity content in the concrete body which is formed as a result of the excess water, which evaporates at a later stage, leads to a significant deterioration in mechanical strengths and stabilities.

In order to reduce this excess water content for a given processing consistency, and/or to improve processibility at a given water/binder ratio, admixtures are used, which are generally referred to as water reducing agents or plasticizers. Agents of this kind used in practice are especially copolymers which are prepared by free-radical copolymerization of acid monomers (for example (meth)acrylic acid) with polyether macromonomers (for example polyalkylene glycol (meth)acrylates). Such copolymers are also called polycarboxylate ethers (PCE) and are described, for example, in EP 0753 488 A2. The properties of the polycarboxylate ethers depend significantly on factors such as acid monomer content and side chain length of the polyalkylene glycol. It is possible according to the requirements to produce relatively good water reducers and slump retainers.

However, it has been found to be disadvantageous in practice that the dispersions of inorganic binders produced with polycarboxylate ethers, especially cementitious binders such as concrete, in the fresh state have a relatively high viscosity. In the construction sector, particularly in the concrete sector, there is a great need to lower the viscosities of the binder dispersions produced, especially of concrete. For example, this increases the pumpability of the concrete, which is often to be transported over long distances. In the case of reduced viscosities, it is also easier, more reliable (i.e. all sites in the casting are reliably reached) and particularly quicker to cast an object with concrete. It is known that objects of relatively high angularity which are additionally equipped with steel reinforcement place particularly high demands on the concrete, processibility being understood to mean particularly sufficient flowability and not too high a viscosity.

The prior art discloses, in WO 2010/026155, polyethylene glycol structures with a diphosphonate function as an anchor group at one end of the polyethylene glycol. These compounds are likewise used as dispersants, for example for concrete. Said plasticizers have an improved viscosity compared to the polycarboxylate ethers, i.e. a reduced viscosity relative to the polycarboxylate ethers, but the strengths, particularly the early strengths, of the concrete are adversely affected to a relatively high degree. This is a great disadvantage on the building site, since the progress of building is known to depend crucially on the early strengths of the concrete. In the precast concrete components works, the cycles for the completion of the precast concrete component likewise depend crucially on the early strengths. There is still a need in the building industry to further enhance the early strengths of the concrete, more particularly compared to the plasticizers of WO 2010/026155. More particularly, plasticizers with low viscosity and good evolution of early strength are desired. Early strength is understood to mean, especially preferably, the strengths after 6 to 24 hours after the building material mixture has been made up with water, more preferably after 12 to 24 hours and especially preferably after 24 hours. The early strengths are determined to ASTM standard C109/C109M-11a.

It is thus an object of the present invention to provide dispersants which, given sufficient water reduction capacity and good economic viability (cost), enable further reduction in the viscosities of inorganic particles, especially of concrete, and at the same time achievement of very good early strengths. These properties are desired very particularly in the precast concrete components works.

This object is achieved by a dispersant for inorganic particles, preferably for inorganic binders, more preferably for hydraulic binders, said dispersant comprising the following structural units i) at least one triazine structural unit, preferably at least one 1,3,5-triazine structural unit, the case of more than one triazine structural unit being referred to as case A and the case of one triazine structural unit being referred to as case B, and in case A preferably 2 to 6, more preferably 2 to 4 and especially preferably 2 triazine structural units being present, ii) at least one polyalkylene glycol structural unit, preferably one to 4 and more preferably one or two polyalkylene glycol structural units, especially preferably one polyalkylene glycol structural unit, iii) and at least two phosphoric ester structural units, preferably 2 to 10, more preferably 2 to 6 and especially preferably 2 to 4 phosphoric ester structural units.

The inorganic particles which may be dispersed include α-calcium sulfate hemihydrate, β-calcium sulfate hemihydrate, calcium sulfate in the form of anhydrite, lime, gypsum, (portland) cement, slag sand, fly ash, fumed silica, blast furnace slag, natural pozzolans and/or burnt oil shale. Examples of natural pozzolans include volcanic ashes, trass, tuff, pumice, sedimentary rock, aluminas and ignimbrite. Natural pozzolans shall preferably be understood to mean trass, pumice, aluminas, tuff and/or ignimbrite.

The object of the present invention is also achieved by a process for preparing these dispersants, by building material mixtures comprising one or more dispersants and one or more inorganic binders selected from the group of (portland) cement, α-calcium sulfate hemihydrate, β-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion of greater than 40% by weight based on the total amount of the inorganic binder in the inorganic binder. The object of the present invention is also achieved by the use of the dispersants as a water reducing agent for aqueous inorganic binders, by the use of the dispersants as a means for reducing the viscosity of aqueous inorganic binders, by the use for enhancing the early strengths of aqueous inorganic binders, the inorganic binders in each case being selected from the group of (portland) cement, α-calcium sulfate hemihydrate, β-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion of greater than 40% by weight based on the total amount of the inorganic binder in the inorganic binder.

The inventive dispersants comprise i) at least one triazine structural unit, preferably at least one 1,3,5-triazine structural unit.

A triazine structural unit is understood to mean, by the empirical formula $C_3N_3$ aromatic six-membered ring systems having three nitrogen atoms in the ring, preference being given to 1,3,5-triazine structural unit(s) and/or 1,2,4-triazine structural unit(s), particular preference to 1,3,5-triazine structural unit(s). The free valences on the carbon atoms are not considered.

For easier distinction, the case of two or more triazine structural units shall be referred to as case A, and the case of one triazine structural unit as case B. In case A, preferably 2 to 6, more preferably 2 to 4 and especially preferably 2 triazine structural units are present.

Especially preferably, a 1,3,5-triazine structure defined by the following structural formula:

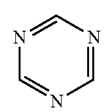

Especially preferably, a 1,2,4-triazine structural unit is defined by the following structural formula:

The triazine structural unit, preferably the 1,3,5-triazine structural unit, is preferably substituted on the carbon atoms, for example radicals comprising the structural units ii) and iii). Further details in this regard can be taken from the description which follows. The radicals may, for example, also be halogens (F, Cl, Br, I), which may originate, for example, from reactants not fully depleted in the preparation, for example 2,4,6-trihalo-1,3,5-triazine. Preferably, no halogens are present any longer as substituents on the carbon atoms of the triazine structural units. The substituents on the triazine structural units or the triazine structural units are not particularly restricted, but are subject to the proviso that, according to the claims, structural units of the ii) and iii) type are also present in the dispersant. Examples of substituents on the carbon atoms of the triazine structural units are specified in the dependent claims. In the description which follows, the statements made generally for triazines or triazine structural units do of course also apply to specific triazines, for example 1,2,4-triazines and especially for the preferred 1,3,5-triazines and the halogenated reacted precursors thereof.

The proportion by weight of all triazine structural units i) in the dispersant is preferably from 0.1 up to 17% by weight, more preferably from 0.1 to 12% by weight, especially preferably from 0.3 to 10% by weight, based in each case on the total mass of the dispersant. More preferably, the proportion by weight of all triazine structural units i) is calculated as the sum of the masses of all structural units of the triazine ($M(C_3N_3)$=78 g/mol) in the dispersant, based on the total mass of the dispersant.

In the calculation of the total mass of the dispersant, the mass calculation of any phosphoric ester structural units iii) present in a (partly) neutralized form should be effected in an analogous manner as $—O—PO_3H_2$ with the molar mass $M(—O—PO_3H_2)$=189.9 g/mol. The total mass of the dispersant should be calculated in this way in the calculation of all proportions by weight of i), and also of the proportions by weight of ii) and iii) described hereinafter.

The inventive dispersants comprise ii) at least one polyalkylene glycol structural unit, preferably one to 4 and more preferably one or two polyalkylene glycol structural units, especially preferably one polyalkylene glycol structural unit. The polyalkylene glycol structural units are usually hydrophilic structures which particularly ensure steric repulsion between inventive dispersant molecules adsorbed on cement particles.

The proportion by weight of all polyalkylene glycol structural units ii) in the dispersant is preferably from 12 up to 90% by weight, more preferably from 25 to 80% by weight and especially preferably from 30 to 70% by weight, based in each case on the total mass of the dispersant. More preferably, the proportion by weight of all polyalkylene glycol structural units ii) in the dispersant is calculated by forming the sum of all masses of the structural unit(s) $(AO)_n$ in the dispersant, based on the total mass of the dispersant. A is an alkylene having 2 to 18 carbon atoms, and n is an integer from 2 to 500. A is preferably an alkylene having 2 carbon atoms due to the corresponding hydrophilicity of these structures.

The term "polyalkylene glycol structural unit" preferably means that at least two directly adjacent alkylene glycol structural units are present, more preferably in the simplest case of only two alkylene glycol structural units that one structural unit of the -AO-AO- form is present, where A is independently an alkylene and O is oxygen, and A is preferably independently an alkylene having 2 to 18 carbon atoms. The alkylene glycol structural units are preferably present as the general formula $(AO)_n$ where n is an integer from 2 to 500, preferably 5 to 300, more preferably 15 to 200 and especially preferably 20 to 80. A is independently an alkylene, preferably independently an alkylene having 2 to 18 carbon atoms, and O is oxygen. Any structural units which occur in a molecule and do not satisfy the definition of $(AO)_n$ where n is an integer from 2 to 500 shall not be considered to be a polyalkylene glycol structural unit in the sense of this patent application. More particularly, individual alkylene glycols AO present separately from one another in the molecule shall not be considered to be a polyalkylene glycol structural unit in the sense of this patent application.

The polyalkylene glycol structural units of the general formula $(AO)_n$ may be the same or different in terms of A, and are preferably each independently selected from an alkylene having 2 to 18 carbon atoms. More preferably at least 60 mol % of A is an alkylene having 2 carbon atoms, and especially preferably at least 80 mol % is an alkylene having 2 carbon atoms, where the figures in mol % are each based on the total number of moles of all structural units $(AO)_n$ in the dispersant. The polyalkylene glycol structural units of the general formula $(AO)_n$ may, in the presence of various alkylene glycol repeat units (AO), be present either in (possibly multiple) blocks (sections with identical alkylene glycol repeat units) or in the form of an approximately random distribution of the alkylene glycol repeat units.

The inventive dispersants comprise iii) at least two phosphoric ester structural units, preferably 2 to 10, more preferably 2 to 6 and especially preferably 2 to 4 phosphoric ester structural units.

The phosphoric ester structural units are negatively charged in the alkaline aqueous medium (e.g. cementitious systems) and can form a kind of anchor function to the positively charged cement grain surface via electrostatic interactions.

Preferably, the phosphoric ester structural unit(s) iii) is/are phosphoric monoester structural unit(s). More particularly, the phosphoric monoester structural unit(s) has/have the following substructure: $—O—PO_3H_2$. The phosphoric ester structural units also comprise the corresponding esters in a (partly) neutralized form. It is possible for all or some protons of the aforementioned structure to be replaced by, for example, alkali metal/alkaline earth metal ions or by ammonium ions.

Preference is given to calcium salts of the inventive dispersants, calcium cation preferably being present on the phosphoric ester structural unit. The calcium salts of the inventive dispersants are notable in that, compared to, for example, the protonated form (acid) or to the corresponding alkali metal salts, very good slump retention properties have been found. The calcium salts of the inventive dispersants give much lower adsorption rates onto the surface of the cement particles and therefore lead to higher slump retention. The invention also relates to the use of alkaline earth metal salts of the inventive dispersants according to any of Claims 1 to 11 as a slump retainer.

The proportion by weight of all phosphoric ester structural units iii) in the dispersant is preferably from 0.5 up to 90% by weight, preferably from 2 to 60% by weight and especially preferably from 3 to 55% by weight, based in each case on the total mass of the dispersant. More preferably, the proportion by weight of all phosphoric ester structural units iii) is calculated as the sum of all —O—PO$_3$H$_2$ structural units (M(—O—PO$_3$H$_2$)=189.9 g/mol) in the dispersant. If phosphoric ester structural units iii) are to be present in a (partly) neutralized form, the mass calculation should nevertheless be effected as —O—PO$_3$H$_2$ with the molar mass M(—O—PO$_3$H$_2$)=189.9 g/mol). A (partly) neutralized form shall be understood to mean that some or all of the protons on the phosphoric ester group(s) have been replaced by other cations, for example alkali metal/alkaline earth metal ions.

The inventive dispersants are used, based on the sum of all inorganic particles, preferably on hydraulic binders, especially preferably on (portland) cement, preferably in dosages of 0.01% by weight to 5% by weight, more preferably in dosages of 0.1% by weight to 2% by weight.

Based on (portland) cement, the preferred dosage is 0.2% by weight-1.0% by weight.

The inventive dispersants enable the user in the building industry, especially in the concrete specialist sector, to achieve sufficient water reduction with relatively low viscosities of the concrete and good early strengths.

Preference is given to dispersants characterized in that, in case A, at least one of the triazine structural units is substituted on at least one carbon atom of one or more aromatic triazine rings, preferably on one or two of the carbon atoms of one or more aromatic triazine rings, independently by a substituent selected from —N—R(—R$^1$), —S—R and/or —O—R, or, in case B, the triazine structural unit is substituted on at least one carbon atom of the aromatic triazine ring, preferably on one or two of the carbon atoms of the aromatic triazine ring, independently by a substituent selected from N—R(—R$^1$), —S—R and/or —O—R, where, in both case A and in case B, R in each case is the same or different and is independently defined as a radical comprising at least one polyalkylene glycol structural unit, and where R$^1$ is the same or different and is independently defined as H, C$_1$- to C$_{20}$-alkyl radical or a structural unit comprising a polyalkylene glycol structural unit, preferably H.

In cases A and B, the aforementioned substituents may thus be the same or different and are each independently —N—R(—R$^1$), —S—R and/or —O—R. This means that one or more types of attachment of polyalkylene glycol structural units to the triazine structural unit(s) are possible in the dispersant molecule via reactants in the form of amines, mercaptans and/or alcohols. Preference is given to alcohols (as the reactant), which means that the substituent is O—R, with the aforementioned definitions for R. The type of the proposed attachment of polyalkylene glycols to the triazine structure is preferred particularly due to the good reactivity of the nucleophiles, but also due to the stability of the resulting bonds. Further details in this regard can be found in the text below in the description of the preparation processes for the inventive dispersants.

Preference is given to dispersants characterized in that the substituent(s) on the triazine structural unit(s) is/are —O—R where R is the same or different and is independently defined as a radical comprising at least one polyalkylene glycol structural unit.

Preference is given to dispersants characterized in that at least one radical which comprises a polyalkylene glycol structural unit and is of general formula $$-(AO)_n-R^2 \qquad (I)$$

is present in the dispersant, where A is an alkylene having 2 to 18 carbon atoms, at least 60 mol % of A preferably being an alkylene having 2 carbon atoms, especially preferably at least 80 mol % being an alkylene having 2 carbon atoms, where the figures in mol % are each based on the total number of moles of all structural units (AO)$_n$ in the dispersant, n is an integer from 2 to 500, preferably 5 to 300, more preferably 15 to 200, especially preferably 20 to 80, R$^2$ is the same or different and is independently H and/or a hydrocarbyl radical.

As the R$^2$ radical, a hydrocarbyl radical is preferred over H. The hydrocarbyl radical may, for example, be a branched or unbranched aliphatic radical, an aromatic radical, aryl radical, or other hydrocarbyl radical. More preferably, R$^2$ is an alkyl radical, especially preferably a C$_1$- to C$_{20}$-alkyl radical. Preferred alkyl radicals are C$_1$- to C$_4$-alkyl radicals, especially methyl radicals.

The polyalkylene glycol structural units (AO)$_n$ in the general formula (I) may analogously, as mentioned above with regard to A, be the same or different and are preferably each independently selected from an alkylene having 2 to 18 carbon atoms. At least 60 mol % of A is preferably an alkylene having 2 carbon atoms, and especially preferably at least 80 mol % is an alkylene having 2 carbon atoms, where the figures in mol % are each based on the total number of moles of all structural units (AO)$_n$ in the dispersant. The polyalkylene glycol structural units of the general formula (AO)$_n$ may, in the presence of different alkylene glycol repeat units (AO), be present either in (possibly multiple) blocks (sections with identical alkylene glycol repeat units) or in the form of an approximately random distribution of the alkylene glycol repeat units.

As already mentioned above, polyalkylene glycol structural units are particularly suitable for generating steric repulsion between inventive dispersant molecules adsorbed on cement particles, which enables particularly efficient dispersion of the particles. Polyalkylene glycol structural units of the general formula (I) are particularly suitable for this purpose.

In the case of dependence of Claim 4 on Claim 2 or 3, the R radical comprising at least one polyalkylene glycol structural unit preferably corresponds to the general formula (I).

Preference is given to dispersants characterized in that the weight ratio of the triazine structural unit(s) i) to the phosphoric ester structural units iii) in the dispersant is between 1/4.5 and 1/12, preferably between 1/5 and 1/10, especially preferably between 1/6 and 1/9.5.

Especially preferably, the weight ratio of the triazine structural unit(s) i) to the phosphoric ester structural units iii), preferably to the phosphoric monoester structural units, is between 1/7 and 1/12.

In the calculation of the aforementioned weight ratio, the sum of all masses of the triazine structural unit(s) in the dispersant is formed and divided by the sum of all masses of the phosphoric ester structural units iii). More preferably, the calculation uses the mass of triazine (C$_3$N$_3$) as the "molar" mass at 78 g/mol. More preferably, the calculation uses the mass of the phosphoric ester structural unit (—O—PO$_3$H$_2$) as the "molar" mass at 189.9 g/mol. As mentioned above, in an analogous manner, this type of calculation should also be employed in the event of any (partial) neutralization of the phosphoric ester.

It is advantageous in this range of weight ratios of i) to iii) that a balanced equilibrium exists between adsorbed and unadsorbed dispersant. In this way, the dispersant, given sufficient initial water reduction, is also suitable for a prolonged application period (slump retention).

Preference is given to dispersants, characterized in that, in case A, at least one of the triazine structural units on at least one carbon atom of one or more aromatic triazine rings, preferably on one or two carbon atoms of one or more aromatic triazine rings, is independently substituted by a substituent selected from the general formulae (IIa) and/or (IIb), or, in case B, the triazine structural unit on at least one carbon atom of the aromatic triazine ring, preferably on one or two of the carbon atoms of the aromatic triazine ring, is independently substituted by a substituent selected from the general formulae (IIa) and/or (IIb), where, in cases A and B, the general formulae in each case are —N—(CH$_2$CH$_2$—O—PO$_3$H$_2$)$_2$ (IIa)

and

—NH—CH$_2$CH$_2$—O—PO$_3$H$_2$. (IIb)

The general formula (IIa) with two phosphoric ester groups is preferred over (IIb) with one phosphoric ester.

Preference is given to case A dispersants characterized in that one or more structural unit(s) which connect at least two triazine structural units and are of the general formula (IIIa) and/or (IIIb) is/are present and the general formulae of the structural units (IIIa) and (IIIb) are Q-(T-triazine)$_k$ (IIIa)

where
k is an integer greater than 1, preferably 2 to 6, especially preferably 2 or 3,
T is O, —N—H or S and
Q is any hydrocarbyl radical, preferably an alkylene radical, more preferably an alkylene radical having 2 to 20 carbon atoms, Q especially preferably being an ethylene radical, and T is —N—H— or O, (triazine)-U—[(CH$_2$)$_2$—N(V)—]$_m$—(CH$_2$)$_2$—U-(-triazine), (IIIb)

where
m is an integer from 1 to 6, m preferably being an integer from 1 to 3,
U is the same or different and is independently O, S and/or —N—H, U preferably being —N—H,
V is H and/or triazine.

In the general formula (IIIa), T is preferably —N—H or O.

Examples of compounds (reactants) of the general formula (IIIa) are alkylenediamines, for example hexamethylenediamine, especially ethylenediamine (T=—N—H). In the case that T=O and k=3, the compound is glycerol.

Examples of compounds (reactants) of the general formula (IIIb) are polyethyleneamines, for example diethylenetriamine (m=1, U=—N—H), triethylenetetramine (m=2, U=—N—H) and/or tetraethylenepentamine (m=3, U=—N—H).

Preference is given to case A dispersants characterized in that the dispersant contains at least one phosphoric diester structural unit, the phosphoric diester structural unit preferably corresponding to the general formula (IV)

—O—PO(OH)—O—, (IV)

the dispersant more preferably containing a structure which connects at least two triazine structural units, preferably 1,3,5-triazine structural units, and is of the general formula (IVa)

(triazine)-N(W)—(CH$_2$)$_2$—O—PO(OH)—O
—(CH$_2$)$_2$—N(W)-(triazine), (IVa)

where w is independently —CH$_2$CH$_2$—O—PO$_3$H$_2$ and/or H. W is preferably —CH$_2$CH$_2$—O—PO$_3$H$_2$.

Case A dispersants with at least one phosphoric diester structural unit in the dispersant are particularly suitable for maintaining the flowability (generally over a period of up to approx. 30 minutes) of inorganic particles, especially of concrete. Hydrolysis of the phosphoric diesters eliminates crosslinking of the dispersants, the number of dispersant molecules available rises, and the number of negatively charged phosphate ions available as anchor groups also rises. This maintains the slump of concrete.

Preference is given to case A dispersants characterized in that two triazine structural units are present, one or two polyalkylene glycol structural units are present and 3 to 6 phosphoric ester structural units are present. In the case of two polyalkylene glycol structural units, preferably 3 to 4 phosphoric ester structural units are present, and, in the case of one polyalkylene glycol structural unit, 3 to 6 and especially preferably 4 to 6 phosphoric ester structural units are present.

It has been found that a balanced ratio of polyalkylene glycol structural units and phosphoric ester structural units is preferentially important for a balanced ratio of water reduction and slump retention.

Preference is given to case B dispersants according to any of Claims 1 to 6 where only one triazine structural unit is present, characterized in that one or two polyalkylene glycol structural units and two to four phosphoric ester structural units are present, preferably two to four phosphoric ester structural units in the presence of one polyalkylene glycol structural unit, more preferably two phosphoric ester structural units in the presence of two polyalkylene glycol structural units.

Preference is given to case B dispersants according to Claim 10, characterized in that the dispersant corresponds to the structure (Va) or (Vb), where (Va) is

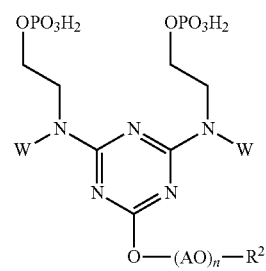

and
(Vb) is

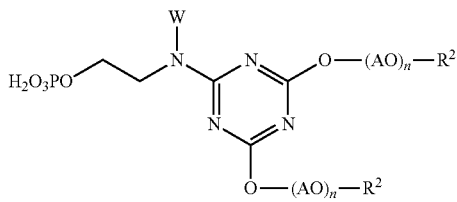

where $R^2$ in each of the general formulae (Va) and (Vb) is the same or different and is independently H and/or a hydrocarbyl radical, and W is independently —$CH_2CH_2$—O—$PO_3H_2$ and/or H. Preferably, W is —$CH_2CH_2$—O—$PO_3H_2$. As the $R^2$ radical, a hydrocarbyl radical is preferred over H. The hydrocarbyl radical may, for example, be a branched or unbranched aliphatic radical, an aromatic radical, aryl radical or other hydrocarbyl radical. More preferably, $R^2$ is an alkyl radical, especially preferably a $C_1$- to $C_{20}$-alkyl radical. Preferred alkyl radicals are $C_1$- to $C_4$-alkyl radicals, especially methyl radicals. The substituent A is an alkylene and is as defined above.

Preference is given to the structures having two phosphoric ester groups or especially preferably having four phosphoric ester groups, corresponding to the formulae

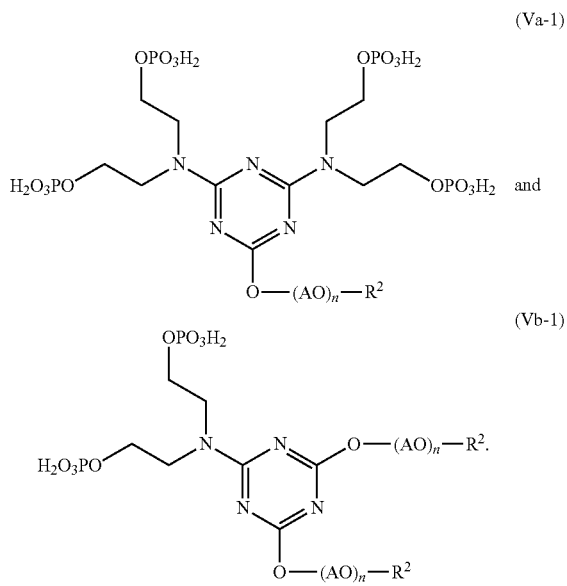

The substituent $R^2$ in the formulae (Va-1) and (Vb-1) is in each case as defined above. The substituent A is an alkylene and is as defined above.

The invention also relates to a process for preparing dispersants for inorganic particles, characterized in that
1.) the following reactants are used:
a) one or more trihalotriazines, preferably 2,4,6-trihalo-1,3,5-triazine, especially preferably 2,4,6-trichloro-1,3,5-triazine,
b) one or more compounds which comprise at least one polyalkylene glycol unit and react with the halogen substituents of the trihalotriazine, preferably a nucleophilic compound, the compound more preferably comprising only one nucleophilic radical reactive with the halogen substituents of the trihalotriazine,
c-1) one or more compound(s) each independently selected from primary and/or secondary amino alcohols, preferably selected from primary and/or secondary alkanolamines, more preferably from primary and/or secondary alkanolamines having more than one hydroxyl function and only one primary or secondary amino function, especially preferably diethanolamine,
and
c-2) at least one phosphating agent, preferably a phosphating agent for phosphation of hydroxyl functions, more preferably a phosphating agent selected from phosphoric acid, phosphorus pentoxide, phosphorus pentachloride, $POCl_3$ and/or polyphosphoric acid, preference being given to polyphosphoric acid,
or alternatively
2.) the reactants a) and b) are used, and independently one or more primary and/or secondary amino alcohol(s) C) phosphated on the hydroxyl function(s), preferably phosphated primary and/or secondary alkanolamine(s), more preferably phosphated primary and/or secondary alkanolamines having more than one phosphated hydroxyl function and only one primary or secondary amino function, especially preferably diphosphated and/or monophosphated diethanolamine, are used.

The individual reactants will be described hereinafter:
Reactant a):

The reactants a) used may, for example, without making any claim to completeness, be 2,4,6-trihalo-1,3,5-triazines from the group of the halogens F, Cl, Br, I. Preference is given to Cl, Br, I, particular preference to 2,4,6-trichloro-1,3,5-triazine. It is also possible to use 3,5,6-trihalo-1,2,4-triazines, for example 3,5,6-trichloro-1,2,4-triazine.
Reactant b):

The reactant b) used may be a compound, preferably nucleophilic compound, which comprises at least on polyalkylene glycol unit and reacts with the halogen substituents of the 2,4,6-trihalo-1,3,5-triazine or of other above-described triazine derivatives. The compound preferably comprises only one nucleophilic radical reactive with the halogen substituents of the trihalotriazine.

Particular preference is given to using one or more compounds independently selected from primary or secondary amines, from mercaptans and/or alcohols, and the primary amines, secondary amines, mercaptans and alcohols are more preferably each independently selected from one of the general structural formulae NH—R(—$R^1$), H—S—R and/or H—O—R, where R in each case is the same or different and is independently defined as a radical comprising at least one polyalkylene glycol structural unit, and where $R^1$ is the same or different and is independently defined as H, $C_1$- to $C_{20}$-alkyl radical or a structural unit comprising a polyalkylene glycol structural unit, preferably H. It is possible to use one or more reactants b) independently of one another.

Examples of the reactant b) are Jeffamine® M2006, Jeffamine® M2070 (Huntsman), methoxy polyethylene glycol thiol (Aldrich), methyl polyethylene glycol (Pluriol® A 1010 E or—Pluriol® A 5010 E).
Reactant c-1):

Preferred amino alcohols are primary and/or secondary alkanolamines. Especially preferred are alkanolamines having more than one hydroxyl function and only one primary or secondary amino function. Most preferred are diethanolamine and/or ethanolamine. Diethanolamine is preferred over ethanolamine since, as a result of the presence of two hydroxyl functions, twice as many phosphation sites can be formed on the hydroxyl function than in the case of ethanolamine. The phosphoric acid groups, which are negatively charged at least in an alkaline, aqueous medium (cementitious systems), can act as a kind of anchor function on the cement grain via electrostatic interactions with the positively charged cement grain surface.

It is possible to use one or more reactants c-1) independently of one another.

Also suitable are primary and/or secondary aromatic amino alcohols, for example the aromatic compounds dihydroxybenzylamine, hydroxydopamine or dihydroxyaniline. Aromatic amino alcohols shall generally be understood to mean compounds having an aromatic structure in the molecule. The aromatic amino alcohols used may, for example, be dihydroxybenzylamine, hydroxydopamine and/or dihydroxyaniline.

The primary and/or secondary amines b) should (for delimitation from c-1)) preferably not comprise any primary and/or secondary amino alcohols and, conversely, the alcohols b) should not comprise any primary and/or secondary amino alcohols. This means, for example, that a primary or else a secondary amine b) should preferably not contain any hydroxyl functions. The mercaptans b) should also preferably not comprise any primary and/or secondary amino alcohols.

Reactant c-2):

The reactant c-2) is a phosphating agent, preferably a phosphating agent for phosphation of hydroxyl functions, more preferably a phosphating agent selected from phosphoric acid, phosphorus pentoxide, phosphorus pentachloride, $POCl_3$ and/or polyphosphoric acid, preference being given to polyphosphoric acid. It is possible to use one or more of these phosphating agents successively or simultaneously. Due to the acidic nature of the phosphating agents, the use of the phosphating agents preferably causes a low pH range. In principle, one or more reactants c-2) can be used independently of one another.

Reactant C):

Reactant C) is used essentially in process 2.). Preferred reactants C) are primary and/or secondary amino alcohols phosphated on the hydroxyl groups.

From the group of the amino alcohols, phosphated primary and/or secondary alkanolamines are particularly preferred. It is also possible to use aromatic primary and/or secondary phosphated amino alcohols, for example dihydroxybenzylamine diphosphate, hydroxydopamine phosphate or dihydroxyaniline diphosphate.

The reactant C) can be prepared in a known manner by a corresponding phosphation reaction of primary and/or secondary amino alcohols. The resulting reaction product (reactant C) can be isolated and then used further in more or less pure form in the process according to the invention for preparing the dispersants. However, it is also possible to use the resulting reaction mixture comprising the reactant C) without further isolation in the process according to the invention (in situ preparation of reactant C and further processing in the process according to the invention for preparing the dispersants).

Examples of phosphated primary and/or secondary alkanolamines are ethanolamine phosphated on the hydroxyl function (ethanolamine phosphate ($NH_2$—$CH_2CH_2$—O—$PO_3H_2$)), diphosphated diethanolamine (diethanolamine diphosphate (NH—($CH_2CH_2$—O—$PO_3H_2$)$_2$) and/or monophosphated diethanolamine (diethanolamine monophosphate (NH($CH_2CH_2$—O—H)($CH_2CH_2$—O—$PO_3H_2$)).

Preference is given to alkanolamines which have more than one phosphated hydroxyl function and only one primary or secondary amino function. Particular preference is given to phosphated ethanolamine (ethanolamine phosphate ($NH_2$—$CH_2CH_2$—O—$PO_3H_2$)), diphosphated diethanolamine (diethanolamine diphosphate (NH—($CH_2CH_2$—O—$PO_3H_2$)$_2$)) and/or monophosphated diethanolamine (diethanolamine monophosphate (NH($CH_2CH_2$—O—H)($CH_2CH_2$—O—$PO_3H_2$)).

Especially preferred are diphosphated diethanolamine and/or monophosphated diethanolamine. Depending on the reaction regime in the phosphation for preparation of the reactants C), it is also possible for mixtures of amino alcohols phosphated to a different degree to be formed, for example mixtures of diphosphated diethanolamine and monophosphated diethanolamine (unphosphated alcohol group remains). The use of such reactants C) preferably prepared in situ (without isolation of the reactants C)) is advantageous for economical reasons, since process stages can be dispensed with.

Most preferred is diphosphated diethanolamine. Diphosphated diethanolamine is preferred over monophosphated reactants since twice as many phosphoric ester groups are present as anchor groups.

As reactant C), the phosphated amino alcohols may be the same or different, and one or more phosphated types of amino alcohol(s) may be used independently.

Processes of Alternative 1.):

The reactions of reactant a) with b), and also the reaction of reactant a) with c-1) are nucleophilic aromatic substitution reactions. With departure of hydrogen halide, reaction of a) with b) forms polyalkylene glycol-derivatized triazines, and reaction of a) with c-1) amino alcohol-derivatized triazine. Accordingly, after reaction of a) with b) and c-1), the triazines derivatized correspondingly as the polyalkylene glycol and amino alcohol are obtained, generally as mixtures.

The reaction product from the reaction of reactant a) with b) is preferably characterized by the attachment of the polyalkylene glycol by an oxygen bond (polyalkylene glycol-containing alcohol as nucleophile b)), sulfur bond (polyalkylene glycol-containing mercaptan as nucleophile b)) or amino bond (polyalkylene glycol-containing amine as nucleophile b)) on one or more, preferably one or two, carbon atoms of the triazine ring.

In the reaction of reactant a) with c-1), preferably essentially the more reactive amino function of the primary or secondary amino alcohols will react to correspondingly form preferentially the amino alcohol-derivatized triazine derivatives with an amino bond on one or more carbon atoms of the triazine ring and one or more free hydroxyl groups. The free hydroxyl groups from the reactant c-1) are available for further reaction with the phosphating reagents c-2) (preferably in reaction stage β-1).

The following reactions scheme illustrates, by way of example, the reaction regime of the first reaction stage α-1, for the case of the reaction of 2,4,6-trichloro-1,3,5-triazine with a hydroxy-functional polyalkylene glycol alcohol b) and then with diethanolamine as component c-1):

Reaction scheme 1:

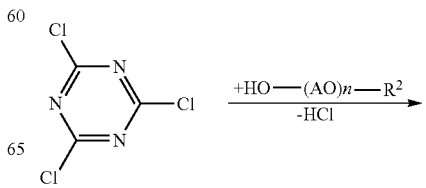

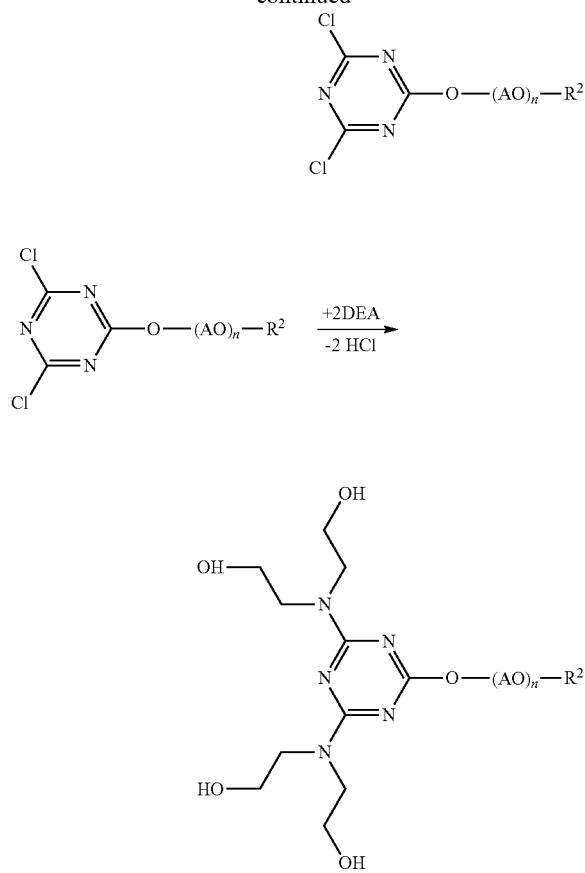

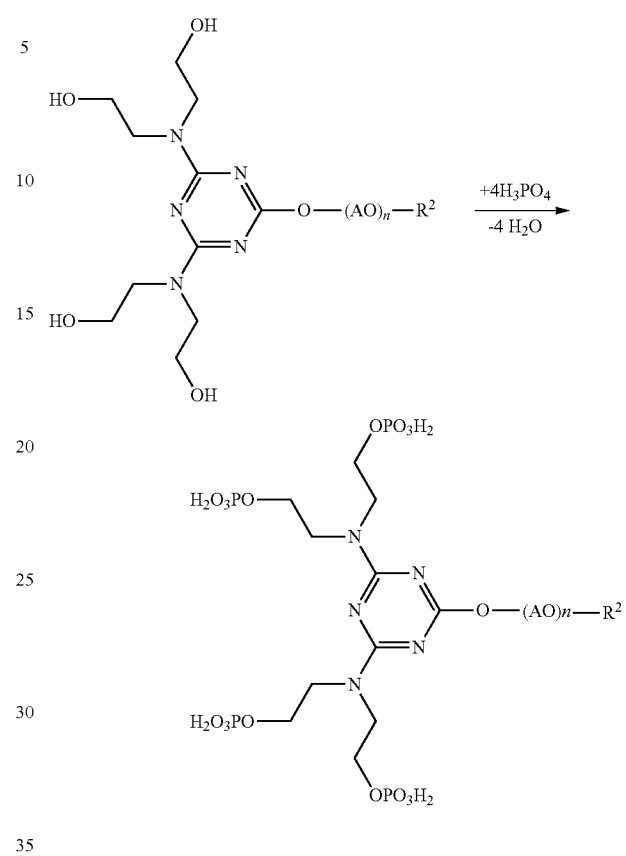

The substituents $R^2$ and A are each as defined above.

Processes of Alternative 2.):

For the reaction of reactant a) with b), the statements made above with regard to the type of reaction and the products which form apply analogously. Reactant C) is a primary or secondary amino alcohol product which has already been partly or fully phosphated. For this reason, a phosphation step is no longer absolutely necessary. After reaction of a) with b) and C), the triazines derivatized correspondingly as the polyalkylene glycol and phosphated amino alcohol are obtained, generally as mixtures. The process of alternative 1.) is preferred over alternative 2.). The case B products with a triazine structural unit are preferred over case A.

The following reaction scheme 3 illustrates the reaction regime for the case of the reaction of a 2,4,6-trihalo-1,3,5-triazine with a hydroxy-functional polyalkylene glycol alcohol b) and then with diphosphated diethanol as component C):

Reaction scheme 3:

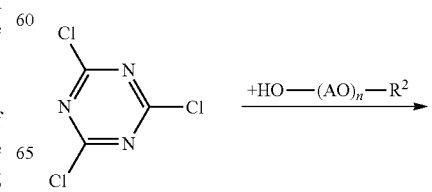

The number of repeat units n is greater than 1 and is preferably within the above-described ranges. $R^2$ is the same or different and is independently H and/or a hydrocarbyl radical. The substituent A is an alkylene and is as defined above. As the $R^2$ radical, a hydrocarbyl radical is preferred over H. The hydrocarbyl radical may, for example, be a branched or unbranched aliphatic radical, an aromatic radical, aryl radical, or other hydrocarbyl radical. $R^2$ is more preferably an alkyl radical, especially preferably a $C_1$- to $C_{20}$-alkyl radical. Preferred alkyl radicals are $C_1$- to $C_4$-alkyl radicals, especially methyl radicals. The substituent A is an alkylene and is as defined above.

The molar ratios of the reactants a)/b)/c-1)/c-2) are preferably in the range of 1/0.8-2.5/0.8-2.5/1-5, preferably 1/0.9-2.3/1-2.5/2-5, especially preferably in the range of 1/1-2/1.5-2.5/2-4. The reactant a) was selected as a constant of 1.

In process 1.), preferably, in a first reaction stage α-1), reactant a) is reacted simultaneously with reactants b) and c-1), or reaction is effected with reactant a) in any sequence, i.e. a) is first reacted with b) and then with c-1), or reactant a) with c-1) and then with b). The reaction of reactant a) with b) and then with reactant c-1) is particularly preferred. The reactions are effected preferably in the alkaline pH range, more preferably at a pH greater than 9.

The following reaction scheme illustrates, by way of example, the phosphation reaction (second reaction stage β-1) of the intermediate formed with the phosphating reagent phosphoric acid:

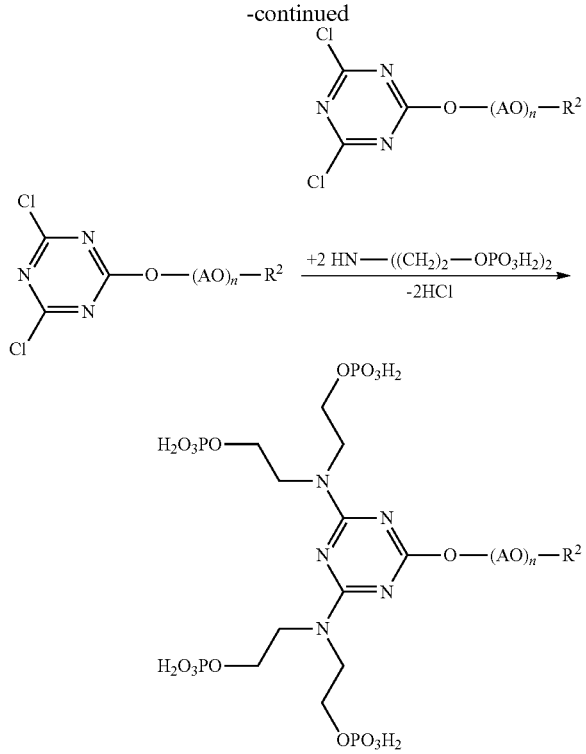

The substituents $R^2$ and A are each as defined above.

The molar ratios of reactants a)/b)/C) are preferably in the range of 1/0.8-2.5/0.8-2.5, preferably in the range of 1/0.9-2.3/0.9-2.3, more preferably in the range of 1/1-2/1-2. The reactant a) has been selected as a constant of 1.

In the case of process alternative 2.), it is possible to dispense with the use of c-1) and c-2) by use of reactant C), i.e. reactant C) will generally be the intermediate from the reaction of c-1) and c-2). The process of case 2.) using phosphated amino alcohol component C) is especially preferably suitable for controlled preparation of case B dispersants with only one triazine structural unit. The hydroxyl groups of c-1) react in the reaction with phosphating reagent c-2) to give the phosphoric esters C). Any reaction of the hydroxyl groups of reactant c-1) in a nucleophilic substitution reaction on the triazine skeleton of a) is thus ruled out, and hence formation of structures of the A type with two or more triazine structural units is avoidable. Especially when only monofunctional nucleophiles are used as reactant b) together with monofunctional C), preferably no dispersants with two or more triazine structural units can form, since in that case no poly functionalities which can possibly act as crosslinkers are present.

Preference is thus given to a process for preparing case B dispersants with one triazine structural unit for inorganic particles, characterized in that reactant a) is one or more trihalotriazines, preferably one or more 2,4,6-trihalo-1,3,5-triazines, more preferably 2,4,6-trichloro-1,3,5-triazine, reactant b) is one or more nucleophilic compounds which comprise at least one polyalkylene glycol unit and react with the halogen substituents of the 2,4,6-trihalo-1,3,5-triazine, said nucleophilic compound comprising only one nucleophilic radical reactive with the halogen substituents of 2,4,6-trihalo-1,3,5-triazine, and independently one or more primary and/or secondary amino alcohol(s) C) phosphated on the hydroxyl function(s), preferably phosphated primary and/or secondary alkanolamine (s), more preferably phosphated primary and/or secondary alkanolamines having more than one phosphated hydroxyl function and only one primary or secondary amino function, especially preferably diphosphated and/or monophosphated diethanolamine, are used.

In principle, the process for preparing the inventive dispersants can be executed according to method 1.) or 2.), but it is also possible to combine the two processes, for example by executing method 1.) with reactants c-1) and c-2) and additionally using reactant C).

Preferably, according to the teaching of dependent Claim 13, in a first reaction stage α-1), reactant a) is reacted with reactants b) and c-1), preferably under alkaline pH conditions, more preferably at a pH greater than 9, and, in a second reaction stage β-1), the product obtained from the first reaction stage α-1) is phosphated with a phosphating agent c-2) or, alternatively in process alternative 2.), reactant a) is reacted with reactants b) and C) under alkaline pH conditions, preferably at a pH less than 9.

The separation of the two reaction steps (nucleophilic substitution with c-1) under alkaline conditions and phosphation with c-2) under acidic conditions) is advantageous due to the different pH ranges of the two reactions. The phosphating agent c-2) is preferably converted as the last reaction partner after reaction of reactant a) with reactants b) and c-1).

The pH of the reaction mixture (for example of reaction stage α-1) should preferably be determined at 20° C. with a dilution of the reaction mixture with distilled water in a ratio of 1 part of reaction mixture to 100 parts of distilled water.

Preference is given to a process for preparing case A dispersants for inorganic particles according to Claim 7, characterized in that the reactants used are polyamines, polyalcohols and/or polymercaptans according to one of the general formulae (IIIa')

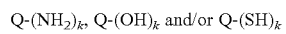
$Q\text{-}(NH_2)_k, Q\text{-}(OH)_k$ and/or $Q\text{-}(SH)_k$ where k is an integer greater than 1, preferably 2 to 6, especially preferably 2 or 3, Q is any hydrocarbyl radical, preferably an alkylene radical, more preferably an alkylene radical having 2 to 20 carbon atoms, and/or polyethyleneamines according to the general formula (IIIb')

$NH_2\text{—}[(CH_2)_2\text{—}NH\text{—}]_m\text{—}(CH_2)_2\text{—}NH_2$, where m is an integer from 1 to 6, preferably an integer from 1 to 3.

The use of the nucleophiles according to one of the general structural formulae (IIIa') and of the polyethyleneamines according to the general structural formula (IIIb') leads to bond formation between at least two triazine structural units. According to the selected use amounts of polyfunctional nucleophiles according to the general formulae (IIIa') and/or (IIIb'), it is possible to adjust the degree of linkage between the triazine units by the polyfunctional nucleophiles according to the general formulae (IIIa') and/or (IIIb').

Examples of the reactants (IIIa') are polyamines such as ethylenediamine, $H_2N\text{—}CH_2\text{—}CH_2\text{—}NH_2$, 1,3-diaminopropane, $H_2N\text{—}(CH_2)_3\text{—}NH_2$ and/or hexamethylenediamine, $H_2N\text{—}(CH_2)_6\text{—}NH_2$. Mention should likewise be made of glycerol.

Examples of (IIIb') are polyethyleneamines such as compounds from the group of diethylenetriamine (m=1, U═N—H), triethylenetetramine (m=2, U═N—H) and/or tetraethylenepentamine (m=3, U═N—H).

Preference is given to a process for preparing a case A dispersant according to Claim 8 which contains at least one phosphoric diester structural unit, characterized in that phosphation is effected with a phosphating agent c-2) selected from polyphosphoric acid, phosphorus pentachloride and/or POCl$_3$, preferably at temperatures greater than 60° C., more preferably at temperatures greater than 80° C.

Especially preferably, the phosphoric diester structural unit corresponds to the general formula (IV),

—O—PO(OH)—O—. (IV)

Preferably, the process step of phosphation is executed essentially in the absence of water, more preferably at a water content less than 0.1% by weight, based in each case on the sum of the masses of all reactants.

Preference is given to a process characterized in that, in the case of process alternative 1.), in a first reaction stage α-1),
reactant a) is reacted with reactants b) and c-1), preferably under alkaline pH conditions, more preferably at a pH greater than 9,
and, in a second reaction stage β-1),
the product obtained from the first reaction stage α-1) is phosphated with a phosphating agent c-2) or in that, alternatively in process alternative 2.), reactant a) is reacted with reactants b) and C) under alkaline pH conditions, preferably at a pH less than 9.

The intermediate obtained from the first reaction stage α-1) is generally a mixture of triazines which have been substituted by reactants b) and c-1) in a nucleophilic aromatic substitution reaction on the carbon of the triazine skeleton.

In process case 2.), reactant a) can be reacted with b) and C) simultaneously, or reactant a) can be reacted with b) and C) successively in any sequence.

In case 2.), preferably, in a first reaction stage, reactant a) is reacted with reactant b) under alkaline pH conditions, preferably at a pH greater than 9. This preferably forms, in a nucleophilic substitution reaction on the aromatic triazine ring with elimination of the corresponding halogen acid, a polyalkylene glycol-derivatized triazine derivative. Preferably, in a second reaction stage, the intermediate obtained from the first reaction stage (polyalkylene glycol-derivatized triazine) is reacted with one or more phosphated primary or secondary amino alcohol(s) C) under alkaline pH conditions, preferably at a pH greater than 9.

The intermediate obtained from the first reaction stage α-2) in process 2.) is preferably characterized by the attachment of the polyalkylene glycol by an oxygen bond (polyalkylene glycol-containing alcohol as the nucleophile), sulfur bond (polyalkylene glycol-containing mercaptan as the nucleophile) or amino bond (polyalkylene glycol-containing amine as the nucleophile) on one or more carbon atoms of the triazine ring.

Preference is given to a process characterized in that, in process case 1.), the first reaction stage α-1) is conducted by reacting reactant a) with b) and then c-1) under alkaline conditions, preferably at a pH greater than 9.

Preference is given to a process for preparation of case B) dispersants with only one 1,3,5-triazine structural unit according to the general structural formula Va-1, characterized in that, in process 1.), in a first reaction stage α-1), as a), a 2,4,6-trihalo-1,3,5-triazine is reacted with b) a polyalkylene glycol alcohol, preferably a methyl polyethylene glycol, and c-1) diethanolamine, and, in the second reaction stage β-1), the reaction product obtained from the first reaction stage α-1) is phosphated, or alternatively, in case 2.), a) a 2,4,6-trihalo-1,3,5-triazine is reacted with b) a polyalkylene glycol alcohol, preferably a methyl polyethylene glycol, and C) diphosphated diethanol, where the general structural formula Va-1 corresponds to (Va-1)

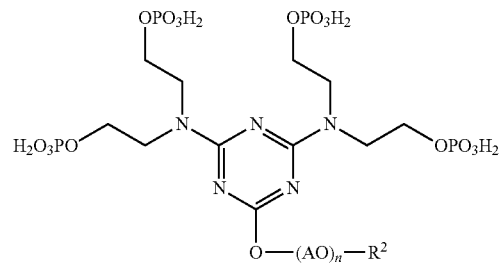

The substituents $R^2$ and A in the formula (Va-1) are each as defined above.

The invention also relates to building material mixtures comprising one or more dispersants and one or more inorganic binders selected from the group of (portland) cement, α-calcium sulfate hemihydrate, β-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion greater than 40% by weight based on the total amount of the inorganic binder in the inorganic binder. The dispersants are preferably present in dried pulverulent form. Corresponding dried products are obtainable by spray-drying, vacuum-drying or roller-drying the aqueous solution.

The invention also relates to the use of the dispersants as water reducing agents for one or more hydraulic inorganic binders selected from the group of (portland) cement, α-calcium sulfate hemihydrate, (β-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion greater than 40% by weight based on the total amount of the inorganic binder in the inorganic binder.

The compositions are used in amounts of 0.01% by weight to 5% by weight, preferably in amounts of 0.01% by weight to 2% by weight, based in each case on the total amount of the inorganic binder. The inventive polymers can also be employed in combination with other admixtures such as water reducers (such as polycarboxylate ethers), air pore formers (such as synthetic surfactants or natural resin soaps), defoamers, retardants (such as phosphates, sucrose or starch hydrolysates), accelerators, stabilizers, sedimentation reducers, shrinkage reducers, and concrete dyes.

The invention also relates to the use of the dispersants as agents for reducing the viscosity of aqueous inorganic binders selected from the group of (portland) cement, α-calcium sulfate hemihydrate, β-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion greater than 40% by weight based on the total amount of the inorganic binder in the inorganic binder. The compositions are used in amounts of 0.01% by weight to 5% by weight, preferably in amounts of 0.01% by weight to 2% by weight, based in each case on the total amount of the inorganic binder. The inventive polymers can also be employed in combination with other admixtures such as water reducers (such as polycarboxylate ethers), air pore formers (such as synthetic surfactants or natural resin soaps), defoamers, accelerators, retardants (such as phosphates, sucrose or starch hydrolysates), stabilizers, sedimentation reducers, shrinkage reducers, and concrete dyes. Particularly in the case of relatively low water to cement ratios (W/C ratios), or in the case of relatively low water to binder ratios (W/B ratios), the partial or complete replacement of conventional comb polymers by the inventive polymers leads to a distinct fall in viscosity. In this case, the W/C ratio, or the W/B ratio, is preferably less than 0.5, more preferably greater than 0.3 and less than 0.5, especially preferably greater than 0.35 and less than 0.5.

The invention also relates to the use of the dispersants for enhancing the early strengths of aqueous inorganic binders selected from the group of (portland) cement, α-calcium sulfate hemihydrate, (β-calcium sulfate hemihydrate, calcium sulfate in the form of anhydrite, slag sand, fly ash, fumed silica, blast furnace slag, natural pozzolans and/or burnt oil shale, preference being given to the presence of (portland) cement with a proportion greater than 40% by weight based on the total amount of the inorganic binder in the inorganic binder. The compositions are used in amounts of 0.01% by weight to 5% by weight, preferably in amounts of 0.01% by weight to 2% by weight, based in each case on the total amount of the inorganic binder. The use of the inventive dispersants allows the water/cement ratios to be reduced and hence the desired final compressive strengths to be increased. Said reduction in the water/cement ratio or water/binder ratio is possible through the use of the inventive dispersants, without having to accept any significant retardation of the cement hydration and any associated adverse effects on the early strengths. The inventive dispersants can, in order to give an even greater improvement in early strength evolution, be combined with additional accelerators (such as calcium chloride or calcium nitrate) or further additives for enhancing early and final strength (e.g. MEA, DEA, TEA, TIPA, THEED, DIHEIPA), The invention also relates to the use of the dispersants as grinding aids in the production of cement, preferably in the grinding of the clinker or clinker blend to give the cement. "Clinker blend" is preferably understood to mean a mixture of clinker and substitutes such as slag, fly ash and/or pozzolans. The compositions are used in amounts of 0.001% by weight to 5% by weight, preferably in amounts of 0.01% by weight to 0.5% by weight, based in each case on the clinker or clinker blend to be ground. It is possible to use the inventive compositions as grinding aids in ball mills or else in vertical mills. The inventive compositions can be used as grinding aids alone or else in combination with other grinding aids, for example mono-, di-, tri- and polyglycols, polyalcohols (for example glycerol of various purities, for example from biodiesel production), amino alcohols (e.g. MEA, DEA, TEA, TIPA, THEED, DIHEIPA), organic acids and/or salts thereof (e.g. acetic acid and/or salts thereof, formates, gluconates), amino acids, sugars and residues from sugar production (e.g. molasses, vinasses), inorganic salts (chlorides, fluorides, nitrates, sulfates) and/or organic polymers (e.g. polyether carboxylates (PCEs)).

Examples:

TABLE 1

Overview of the synthesis examples

| | | | Process alternative | | | |
| | | | 1 | | 2 | |
| No. | Reactant a) | Reactant b) | Reactant c-1 | Reactant c-2 | Reactant C | Base |
|---|---|---|---|---|---|---|
| 1 | 0.37 mol 2,4,6-trichloro-1,3,5-triazine | 0.25 mol Pluriol® A 2010 E | 1.25 mol diethanolamine | 1.3 mol polyphosphoric acid (>83% based on $P_2O_5$) | | NaOH |
| 2 | 0.37 mol 2,4,6-trichloro-1,3,5-triazine | 0.25 mol Pluriol® A 2010 E | 1.25 mol diethanolamine | 1.3 mol polyphosphoric acid (>83% based on $P_2O_5$) | | Ca(OH)$_2$ |
| 3 | 0.37 mol 2,4,6-trichloro-1,3,5-triazine | 0.25 mol Pluriol® A 1020 E | 1.25 mol diethanolamine | 1.3 mol polyphosphoric acid (>83% based on $P_2O_5$) | | NaOH |
| 4 | 0.37 mol 2,4,6-trichloro-1,3,5-triazine | 0.25 mol Pluriol® A 3010 E | 1.25 mol diethanolamine | 1.3 mol polyphosphoric acid (>83% based on $P_2O_5$) | | NaOH |
| 5 | 0.37 mol 2,4,6-trichloro-1,3,5-triazine | 0.25 mol Pluriol® A 2010 E | | | 0.5 mol amino-bis(ethanol phosphate) | NaOH |
| 6 | 0.37 mol 2,4,6-trichloro-1,3,5-triazine | 0.25 mol Pluriol® A 2010 E | | | 0.5 mol phosphocholamine | NaOH |
| 8 (comp.) | 0.37 mol 2,4,6-trichloro-1,3,5-triazine | 0.25 mol Pluriol® A 2010 E | 1.25 mol diethanolamine | | | NaOH |
| 9 | 0.25 mol 2,4,6-trichloro-1,3,5-triazine | 0.5 mol Pluriol® A 1020 E | 1.25 mol diethanolamine | 1.3 mol polyphosphoric acid (>83% based on $P_2O_5$) | | NaOH |

TABLE 1-continued

Overview of the synthesis examples

| | | | Process alternative | | | |
|---|---|---|---|---|---|---|
| | | | 1 | | 2 | |
| No. | Reactant a) | Reactant b) | Reactant c-1 | Reactant c-2 | Reactant C | Base |
| 10 | 0.37 mol 2,4,6-trichloro-1,3,5-triazine | 0.25 mol Pluriol® A 5010 E | 1.25 mol diethanolamine | 1.3 mol polyphosphoric acid (>83% based on $P_2O_5$) | | NaOH |
| 11 | 0.37 mol 2,4,6-trichloro-1,3,5-triazine | 0.25 mol Jeffamin® M 2070 (2000 g/mol) | 1.25 mol diethanolamine | 1.3 mol polyphosphoric acid (>83% based on $P_2O_5$) | | NaOH |

Pluriol® A E is the BASF brand name for methyl polyethylene glycol. The corresponding number indicates the molecular weight.

General Synthesis Method:

The respective amounts of the reactants be specified in table 1 are dissolved in 200 ml of dichloromethane and admixed with 11 g (0.275 mol) of sodium hydroxide powder. At 0° C., the amount of reactant a specified in the table is added and the solution is stirred at room temperature for 1 h. Subsequently, the solution is heated at 60° C. for 2 hours. Process alternative 1: Subsequently, the amount of reactant c-1 specified in table 1 is added dropwise and the solution is kept at 60° C. for 6 h. The resulting suspension is filtered and the clear supernatant solution is freed of solvent. Subsequently, the amounts of reactant c-2 described in table 1 are slowly added dropwise to the melt (70° C.) and the mixture is stirred at 60° C. for a further 5 hours. The substance is dissolved in water and neutralized with the appropriate alkali metal/alkaline earth metal base to a pH of 5 to 6. The solids content is adjusted to 30%.

Process alternative 2: The specified amounts of reactant C are added and the mixture is stirred at 60° C. for 6 hours. The solids content is likewise adjusted to 30%.

The diethanolamine phosphate reactant was prepared analogously to the method in DE10 2005 022 843 A1.

Calorimetric Comparison of the Heats of Hydration

Calorimetry measurements were conducted with 3% by weight of additive—based on the solids content—per 100 g of cement. The tests were conducted in cement lime with a W/C ratio of 0.5. It is possible to show that the inventive dispersants influence the evolution of early strength only to a very minor degree compared to the blank without admixture. The comparative products Optima® 100 and Glenium® B233, in contrast, retard the evolution of early strength to a relatively significant degree. Short polyalkylene glycol side chains (samples No. 1 and 3) show very particularly good evolution of early strength.

BRIEF DESCRIPTION OF THE DRAWINGS

FIG. 1 is a diagram of the calorimetry measurements, which show energy against time.

Mortar Tests

The mortar tests were conducted according to the standard DIN EN 1015-3.

TABLE 2

Slumps of the inventive polymers in the mortar test

| Cement | Admixture | W/C | Temperature | Dosage | Mortar slump (cm) | | |
|---|---|---|---|---|---|---|---|
| | | | | | 0 min | 10 min | 30 min |
| Bernburg 42.5R | — | 0.54 | 22.7 | 0.00% | 23.9 | 22.7 | |
| Bernburg 42.5R | Optima ® 100 (Comp.) | 0.46 | 24.0 | 0.40% | 24.2 | 23.3 | 22.6 |
| Bernburg 42.5R | 1 | 0.46 | 23.9 | 0.20% | 24.0 | 22.2 | 21.2 |
| Bernburg 42.5R | 2 | 0.46 | 23.9 | 0.20% | 23 | 22 | 21.3 |
| Bernburg 42.5R | 3 | 0.46 | 23.6 | 0.40% | 23.2 | 22 | 21.5 |
| Bernburg 42.5R | 4 | 0.46 | 24.0 | 0.30% | 24.3 | 23.3 | 22.1 |
| Bernburg 42.5R | 8-comparative | 0.46 | 23.4 | 0.40% | 20 | | |
| Bernburg 42.5R | 9 | 0.46 | 23.8 | 0.40% | 23.5 | 22.2 | 21.3 |
| Bernburg 42.5R | 10 | 0.46 | 24.1 | 0.40% | 23.4 | 22.4 | 21.2 |
| Bernburg 42.5R | 11 | 0.46 | 23.7 | 0.27% | 24.7 | 23.8 | 22.5 |

TABLE 2-continued

Slumps of the inventive polymers in the mortar test

| | | | | | Mortar slump (cm) | | |
|---|---|---|---|---|---|---|---|
| Cement | Admixture | W/C | Temperature | Dosage | 0 min | 10 min | 30 min |
| Bernburg 42.5R | Glenium ®B233 (Comp.) | 0.43 | 18.3 | 0.32% | 23.3 | 24.6 | 26.2 |
| Bernburg 42.5R | 1 | 0.43 | 19.7 | 0.40% | 23.2 | 20.7 | |
| Karlstadt 42.5R | Glenium ® B233 (Comp.) | 0.45 | 18.2 | 0.35% | 23.2 | 25.4 | 28.8 |
| Karlstadt 42.5R | 1 | 0.45 | 19.7 | 0.50% | 23.7 | 22.2 | 20.9 |
| Karlstadt 42.5R | Optima ® 100 (Comp.) | 0.46 | 19.0 | 0.40% | 19.9 | | |

The cements used are purchased from Schwenk (all CEM I).
W/C = water/cement ratio On the basis of these results, it becomes clear that the water needed to plasticize a mortar to a particular slump flow is significantly reduced by the addition of these polymers. If the addition of the plasticizer is dispensed with, a water/cement ratio (W/C) of 0.54 is required to obtain a slump flow of 23.9 cm. In the case of use of an alkali-rich cement (Karlstadt), the good dispersion property is particularly evident. Compared to Optima® 100, for some of the inventive polymers, a distinct reduction in the dose required to arrive at a similar slump flow is observed. Comparative example 8 without phosphate groups in the structure enables only a relatively low initial slump flow, even at relatively high dosage. The comparative examples with Glenium® B233 from polycarboxylate ether chemistry are approximately comparable with the inventive polymers in terms of action, with better slump retention.

TABLE 3

Evolution of strength in the mortar

| | | | | Slump flow | | Compressive strength [N/mm$^2$] | |
|---|---|---|---|---|---|---|---|
| Cement | Additive | W/C | Dosage | 0 min | 10 min | 1 day | 28 days |
| Bernburg 42.5R | blank | 0.54 | — | 24.5 | 23.5 | 17.67 | |
| | Glenium b233 | 0.45 | 0.095% | 24.5 | 22.5 | 23.92 | 63.73 |
| | Optima ® 100 | 0.45 | 0.400% | 23.9 | 23.1 | 8.69 | 62.53 |
| | 1 | 0.45 | 0.170% | 23.9 | 23.1 | 23.83 | 65.02 |

The strengths of the resulting mortar were tested to DIN EN 196-1.

It is found here that the use of this inventive polymer class has a positive influence on the 1-day and 28-day strengths. Particularly an increased 1-day strength is of particular significance for rapid building progress.

Concrete Tests for Determination of Water Reduction Capacity and of Strengths

The cement used to determine water reduction was a Bernburg CEM I cement.

The slump is a measure of how significantly the concrete cake collapses after the metal cone has been raised (difference in height between the upper edge of the metal cone and the height of the concrete cake after the metal mold has been removed). The slump flow (spread) corresponds to the base diameter of the concrete cake after collapse.

The slump flow is obtained by jolting the spread table, according to DIN EN 12350-5, by lifting and dropping it 15 times. The shear forces which result from the knocking cause further spread of the concrete. The diameter of the concrete cake after the knocking is referred to as the slump flow.

TABLE 4

Evolution of strength in the concrete

| Bernburg CEM I 42.5 R | | | Slump flow [cm] | | Slump [cm] | | Compressive strength |
|---|---|---|---|---|---|---|---|
| Additive | W/C | Dosage [%] | 0 min | 10 min | 0 min | 10 min | [N/mm$^2$] 24 hours |
| blank | 0.55 | — | 47.5 | 45.5 | 14 | 12 | 14.35 |
| OPTIMA ® 100 | 0.45 | 0.60 | 58 | 58 | 22 | 23 | not measurable |
| No. 1 | 0.45 | 0.40 | 58 | 51.5 | 22.5 | 18 | 25.05 |

This example shows that the results from the mortar tests are reflected in the concrete tests. The early strength of a concrete dispersed with the inventive structure (No. 1) has a much higher value compared to, for example, OPTIMA® 100. Under these conditions, the strength is still not measurable after 24 hours since the concrete is still free-flowing.

TABLE 5

Evolution of strength in a concrete with limestone filler

| Monselice A/LL + limestone powder as filler material | | | Compressive strength [N/mm$^2$] |
|---|---|---|---|
| Additive | W/C | Dosage [%] | 24 h |
| 1 | 0.48 | 0.78 | 25.3 |
| 4 | 0.48 | 1.1 | 27.7 |
| Glenium ® B233 | 0.48 | 0.34 | 29.5 |
| OPTIMA ® 100 | 0.48 | 0.78 | 1.9 |
| Blank | 0.55 | | 14.35 |

With increasing side chain length (rising chain length of the polyalkylene glycol in the sequence of inventive examples 3, 1, 4), the 1-day strength rises.

Concrete Tests for Determination of the Plastic Viscosities of the Fresh Concrete The cement used for the viscosities was a CEM II/A-LL 42.5R from the Monselice cement works.

Composition of the concrete: 400 kg of cement filler: 50 kg of limestone powder, temperature: 20° C.

The slump is a measure of how significantly the concrete cake collapses after the metal cone has been raised (difference in height between the upper edge of the metal cone and the height of the concrete cake after the metal mold has been removed). The slump flow corresponds to the base diameter of the concrete cake after collapse.

The slump flow is obtained by jolting the spread table, according to DIN EN 12350-5, by lifting and dropping it 15 times. The shear forces which result from the knocking cause further spread of the concrete. The diameter of the concrete cake after knocking is referred to as the slump flow.

As already in the mortar, the concrete shows much better processibility as result of addition of the inventive polymer.

Apart from the plasticization, another significant factor for the use as stipulated is the viscosity of the fresh concrete. The viscosity is a measure of the pumpability and processibility of the fresh concrete. Lower values lead to better processibility and hence also to better pumpability (Gleitrohr-Rheometer: Ein Verfahren zur Bestimmung der Fließeigenschaften von Dickstoffen in Rohrleitungen [Sliding pipe rheometer: A method to establish the flow properties of high viscous media in pipelines], thesis by Dr. Knut Jens Kasten, TU Dresden. Shaker Verlag; 1$^{st}$ ed. (July 2010)).

Commercial superplasticizers are often comb polymers with polyethylene glycol side chains (PEG side chains), for example Glenium® B233. However, these plasticizers, when used as water reducers, lead to high plastic viscosities of the fresh concrete. This makes it more difficult to pump the fresh concrete and to place it into molds.

The plastic viscosities of the fresh concrete were measured in an IKAR rheometer (reference: E. P. Koehler, D. W. Fowler (2007). "ICAR Mixture Proportioning Procedure for SCC" International Center for Aggregates Research, Austin, Tex.).

In order to obtain comparable results, the amount of additive is dosed such that all fresh concretes have a slump of 23 cm after 5 minutes to DIN EN 12350.

The water/cement ratios are set to 0.48 and the measurement is conducted after 5 minutes.

TABLE 6

Viscosities of the inventive plasticizers in the concrete

| Monselice A/LL + limestone powder | | Plastic viscosity |
|---|---|---|
| Additive | W/C | Pa*s |
| 1 | 0.48 | 120.4 |
| 3 | 0.48 | 76.9 |
| 4 | 0.48 | 136.8 |
| OPTIMA ® 100 | 0.48 | 106.8 |
| Glenium ® B233 | 0.48 | 142.1 |

The viscosity of the blank cannot be measured adequately since much higher W/C ratios would otherwise have to be used here.

The inventive dispersants plasticize concretes and enable achievement particularly of low viscosities of the concrete. Relatively long side chains in the inventive polymers lead to a slight rise in the viscosity of the fresh concrete. However, the viscosities in each case are below those of the polycarboxylate ethers. As is evident from the values, the inventive polymers provide a good way of producing fresh concretes with low W/C ratios and low viscosities.

Results of the Grinding of Clinker for Production of Cement:

In the grinding operations, additive No. 1 of table 1 is added in liquid form in a dosage of 500 ppm (dosage is based on the solids content) to 10 kg of clinker (Mergelstetten clinker), and ground at a temperature of 120° C. for 80 minutes. The mill used is a heatable laboratory ball mill from Cemtec (Labbas1). For comparison, the same clinker is ground under analogous conditions, but without addition of an additive (blank). Compared to the blank, it is possible in the experiment to identify an increase in the Blaine value and a rise in the early strength after 24 hours. The more finely ground particles (higher Blaine value) can also explain the better evolution of strength. Both analysis parameters demonstrate the efficiency of the inventive dispersants as grinding aids.

The mortar tests were conducted with the cement produced by the above process at a W/C ratio of 0.5 and a sand/cement ratio of 3. No further additives were added. The strengths and slump flows were determined according to standards DIN EN 1015-3 and DIN EN 196-1.

| | Blaine [cm$^2$/g] | Slump flow after 4 min | Flexural strength after 24 h | Compressive strength after 24 h |
|---|---|---|---|---|
| Blank (comp.) | 3907 | 20.2 cm | 2.87 N/mm$^2$ | 13.05 N/mm$^2$ |
| No. 1 | 4252 | 20.4 cm | 3.29 N/mm$^2$ | 13.54 N/mm$^2$ |

The invention claimed is:

1. Dispersant for inorganic particles, inorganic binders, or hydraulic binders, said dispersant comprising the following structural units
   i) at least one triazine structural unit, optionally at least one 1,3,5-triazine structural unit, the case of more than one triazine structural unit being referred to as case A and the case of one triazine structural unit being referred to as case B,
   ii) at least one polyalkylene glycol structural unit,
   iii) and at least two phosphoric ester structural units, characterized in that, in case A, at least one of the triazine structural units on at least one carbon atom of one or more aromatic triazine rings, is independently substituted by a substituent selected from the general formulae (IIa) and/or (IIb), or,
   in case B, the triazine structural unit on at least one carbon atom of the aromatic triazine ring, is independently substituted by a substituent selected from the general formulae (IIa) and/or (IIb),
   where, in cases A and B, the general formulae in each case are

   —N—(CH$_2$CH$_2$—O—PO$_3$H$_2$)$_2$      (IIa)

and

   —NH—CH$_2$CH$_2$—O—PO$_3$H$_2$.      (IIb)

2. The dispersant according to claim 1, characterized in that, in case A, at least one of the triazine structural units is substituted on at least one carbon atom of one or more aromatic triazine rings, independently by a substituent selected from —N—R(—R$^1$), —S—R and/or —O—R, or,
   in case B, the triazine structural unit is substituted on at least one carbon atom of the aromatic triazine ring, independently by a substituent selected from N—R(—R$^1$), —S—R and/or —O—R,
   where, in both case A and in case B, R in each case is the same or different and is independently defined as a radical comprising at least one polyalkylene glycol structural unit, and where $R^1$ is the same or different and is independently defined as H, $C_1$- to $C_{20}$-alkyl radical or a structural unit comprising a polyalkylene glycol structural unit.

3. The dispersant according to claim 2, characterized in that the substituent(s) on the triazine structural unit(s) is/are —O—R where R is the same or different and is independently defined as a radical comprising at least one polyalkylene glycol structural unit.

4. The dispersant according to claim 1, characterized in that at least one radical which comprises a polyalkylene glycol structural unit and is of general formula (I) $-(AO)_n-R^2$ is present in the dispersant,
where A is an alkylene having 2 to 18 carbon atoms, where the figures in mol % are based on the total number of moles of all structural units $(AO)_n$ in the dispersant,
n is an integer from 2 to 500,
$R^2$ is the same or different and is independently H and/or a hydrocarbyl radical.

5. The dispersant according to claim 1, characterized in that the weight ratio of the triazine structural unit(s) i) to the phosphoric ester structural units iii) in the dispersant is between 1/4.5 and 1/12.

6. The Case A dispersant according to claim 1, characterized in that one or more structural unit(s) which connect at least two triazine structural units and are of the general formula (IIIa) and/or (IIIb) is/are present and the general formulae of the structural units (IIIa) and (IIIb) are Q-(T-triazine)$_k$      (IIIa)

where
k is an integer greater than 1,
T is O, —N—H or S and
Q is any hydrocarbyl radical, or an alkylene radical, (triazine)-U—[(CH$_2$)$_2$—N(V)—]$_m$—(CH$_2$)$_2$—U-(-triazine),      (IIIb)

where
m is an integer from 1 to 6,
U is the same or different and is independently O, S and/or —N—H,
V is H and/or triazine.

7. The Case A dispersant according to claim 6, wherein Q is an ethylene radical, and T is —N—H—or O.

8. The Case A dispersant according to claim 1, characterized in that the dispersant contains at least one phosphoric diester structural unit.

9. The Case A dispersant according to claim 8 wherein the dispersant contains a structure which connects at least two triazine structural units, and is of the general formula (IVa)

(triazine)-N(W)—(CH$_2$)$_2$—O—PO(OH)—O —(CH$_2$)$_2$—N(W)-(triazine),      (IVa)

where W is independently —CH$_2$CH$_2$—O—PO$_3$H$_2$ and/or H.

10. The Case A dispersant according to claim 8, characterized in that the at least one phosphoric diester structural unit corresponds to the general formula (IV)

—O—PO(OH)—O—.      (IV)

11. The Case A dispersant according to claim 1, characterized in that two triazine structural units are present, one or two polyalkylene glycol structural units are present and 3 to 6 phosphoric ester structural units are present.

12. The Case B dispersant according to claim 1 where only one triazine structural unit is present, characterized in that one or two polyalkylene glycol structural units and two to four phosphoric ester structural units are present.

13. The Case B dispersant according to claim 12, characterized in that the dispersant corresponds to the structure (Va) or (Vb), where (Va) is

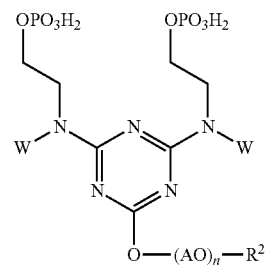

and
(Vb) is

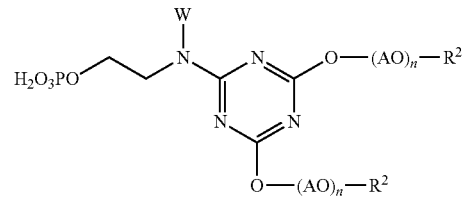

where $R^2$ in each of the general formulae (Va) and (Vb) is the same or different and is independently H and/or a hydrocarbyl radical, and W in formula (Va) is independently —CH$_2$CH$_2$—O—PO$_3$H$_2$ and/or H, and W in formula (Vb) is —CH$_2$CH$_2$—O—PO$_3$H$_2$.

14. The dispersant according to claim 12, comprising two to four phosphoric ester structural units in the presence of one polyalkylene glycol structural unit, or two phosphoric ester structural units in the presence of two polyalkylene glycol structural units.

15. A process for preparing dispersants according to claim 1, characterized in that
1.) the following reactants are reacted:
a) one or more trihalotriazines,
b) one or more compounds which comprise at least one polyalkylene glycol unit and react with the halogen substituents of the trihalotriazine,
c-1) one or more compound(s) each independently selected from primary and/or secondary amino alcohols, or primary and/or secondary alkanolamines,
and
c-2) at least one phosphating agent,
or alternatively
2.) the reactants a), b) and independently one or more primary and/or secondary amino alcohol(s) C) phosphated on the hydroxyl function(s), optionally phosphated primary and/or secondary alkanolamine(s), are reacted.

16. The process according to claim 15, characterized in that, in the case of process alternative 1.), in a first reaction stage α-1),
reactant a) is reacted with reactants b) and c-1), optionally under alkaline pH conditions,
and, in a second reaction stage (β-1),
the product obtained from the first reaction stage α-1) is phosphated with a phosphating agent c-2) or in that, alternatively in process alternative 2.), reactant a) is reacted with reactants b) and C) under alkaline pH conditions.

17. The process according to claim 16, characterized in that, in process case 1.), the first reaction stage α-1) is conducted by reacting reactant a) with b) and then c-1) under alkaline conditions.

18. The process according to claim 15 for preparation of case B) dispersants with only one 1,3,5-triazine structural unit according to the general structural formula Va-1, characterized in that, in process 1.), in a first reaction stage α-1), as a), a 2,4,6-trihalo-1,3,5-triazine is reacted with b) a polyalkylene glycol alcohol, and c-1) diethanolamine, and, in the second reaction stage β-1), the reaction product obtained from the first reaction stage α-1) is phosphated, or alternatively, in case 2.), a) a 2,4,6-trihalo-1,3,5-triazine is reacted with b) a polyalkylene glycol alcohol, optionally a methyl polyethylene glycol, and C) diphosphated diethanol, where the general structural formula Va-1 corresponds to

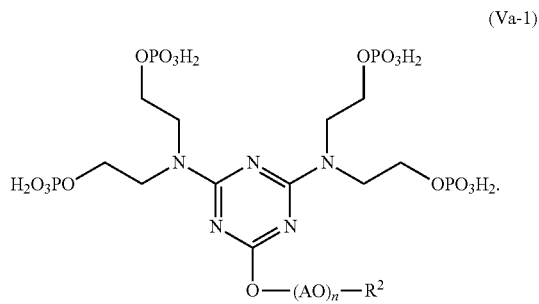

(Va-1)

19. The process according to claim 15, wherein the 1b) compound comprises only one nucleophilic radical reactive with the halogen substituents of the trihalotriazine.

20. The process according to claim 15, wherein the c-1) compound comprises ethanolamine.

21. The process according to claim 15, wherein the c-2) phosphating agent is selected from phosphoric acid, phosphorus pentoxide, phosphorus pentachloride, $POCl_3$ and/or polyphosphoric acid.

22. The process according to claim 15, wherein the one or more primary and/or secondary amino alcohol(s) C) phosphated on the hydroxyl function(s) comprise diphosphated and/or monophosphated diethanolamine.

23. The process according to claim 15, characterized in that
1.) the following reactants are reacted:
a) one or more trihalotriazines,
b) one or more compounds which comprise at least one polyalkylene glycol unit and react with the halogen substituents of the trihalotriazine,
c-1) one or more compound(s) each independently selected from primary and/or secondary amino alcohols, or primary and/or secondary alkanolamines having more than one hydroxyl function and only one primary or secondary amino function,
and
c-2) at least one phosphating agent,
or alternatively
2.) the reactants a), b) and independently one or more primary and/or secondary amino alcohol(s) C) phosphated on the hydroxyl function(s), or phosphated primary and/or secondary alkanolamines having more than one phosphated hydroxyl function and only one primary or secondary amino function, are reacted.

24. Building material mixture comprising one or more dispersants according to claim 1 and one or more inorganic binders selected from the group of α-calcium sulfate hemihydrate, β-calcium sulfate hemihydrate, calcium sulfate in the form of anhydrite, slag sand, fly ash, fumed silica, blast furnace slag, natural pozzolans and/or burnt oil shale, optionally in the presence of (portland) cement with a proportion greater than 40% by weight based on the total amount of the inorganic binder in the inorganic binder.

25. A process for utilizing the dispersants according to claim 1 as water reducing agents of aqueous inorganic binders, selected from the group of α-calcium sulfate hemihydrate, β-calcium sulfate hemihydrate, calcium sulfate in the form of anhydrite, slag sand, fly ash, fumed silica, blast furnace slag, natural pozzolans and/or burnt oil shale, optionally in the presence of (portland) cement with a proportion greater than 40% by weight based on the total amount of the inorganic binder in the inorganic binder, or for concrete, or for concrete for precast component works,
the process comprising mixing said dispersants with at least one of said inorganic binders.

26. A process for utilizing of the dispersants according to claim 1 as a means for reducing the viscosity of aqueous inorganic binders selected from the group of α-calcium sulfate hemihydrate, β-calcium sulfate hemihydrate, calcium sulfate in the form of anhydrite, slag sand, fly ash, fumed silica, blast furnace slag, natural pozzolans and/or burnt oil shale, optionally in the presence of (portland) cement with a proportion of greater than 40% by weight based on the total amount of the inorganic binder in the inorganic binder, the process comprising mixing said dispersants with at least one of said inorganic binders.

27. A process for comprising utilizing the dispersants according to claim 1 for enhancing the early strengths of aqueous inorganic binders selected from the group of α-calcium sulfate hemihydrate, β-calcium sulfate hemihydrate, calcium sulfate in the form of anhydrite, slag sand, fly ash, fumed silica, blast furnace slag, natural pozzolans and/or burnt oil shale, optionally in the presence of (portland) cement with a proportion of greater than 40% by weight based on the total amount of the inorganic binder in the inorganic binder,
the process comprising mixing said dispersants with at least one of said inorganic binders.

28. A process for comprising utilizing the dispersants according to claim 1 as a grinding aid in the production of cement,
the process comprising mixing said dispersants with a clinker or clinker blend.

29. The dispersant according to claim 1, wherein in case A, 2 to 6 triazine structural units are present.

30. The dispersant according to claim 1, wherein 2 to 10 phosphoric ester structural units are present.

* * * * *